United States Patent

Meckl et al.

[11] 4,051,718
[45] Oct. 4, 1977

[54] APPARATUS FOR MEASURING THE VELOCITY OF LOW FREQUENCY VIBRATIONS

[75] Inventors: Ferenc Meckl; Péter Piuk, both of Tatabanya, Hungary

[73] Assignee: Banyaszati Kutato Intezet, Budapest, Hungary

[21] Appl. No.: 647,807

[22] Filed: Jan. 9, 1976

[30] Foreign Application Priority Data

Jan. 9, 1975 Hungary ............... BA 3186

[51] Int. Cl.² .................................. G01V 1/28
[52] U.S. Cl. ........................... 73/71.2; 340/17 R
[58] Field of Search ............... 73/560, 67, 71.2, 70, 73/71, 71.4; 340/17 R

[56] References Cited

U.S. PATENT DOCUMENTS

| | | | |
|---|---|---|---|
| 2,390,187 | 12/1945 | Sharpe | 340/17 |
| 2,764,019 | 9/1956 | Lindholm | 73/71.2 |
| 3,863,200 | 1/1975 | Miller | 340/17 |

*Primary Examiner*—Richard C. Queisser
*Assistant Examiner*—Stephen A. Kreitman
*Attorney, Agent, or Firm*—Young & Thompson

[57] ABSTRACT

The invention concerns apparatus for measuring the velocity of low frequency mechanical vibrations, comprising two springs between which a vibratable mass is secured, two electric coils mechanically coupled to the mass, a permanent magnet core in each coil which is stationary relative to its associated coil, one coil being a measuring coil while the other is a feedback coil; and a current generator having a control input to which the measuring coil is connected while the feedback coil is connected to the generator output, the connection polarities being so selected as to produce negative feedback.

4 Claims, 3 Drawing Figures

APPARATUS FOR MEASURING THE VELOCITY OF LOW FREQUENCY VIBRATIONS

BACKGROUND OF THE INVENTION

1. Field of the Invention

The invention concerns apparatus for the measurement of the velocity of mechanical low frequency vibrations or oscillations, especially of mechanical vibrations of the earth which can in certain circumstances cause damage to objects or articles in the environment, depending on their condition.

2. Description of the Prior Art

So-called geophones or seismophones have been used to measure the magnitude of the vibrations. For buildings, particularly those low frequency vibrations are harmful which have a frequency of the same order of magnitude as the natural frequency of these buildings. The specifications relating to the permissible vibration magnitudes differ according to the respective stipulations of individual countries. In Hungary the highest permissible velocity of vibration sets the standard.

Geophones or seismophones sensitive to the velocity of low frequency vibrations are manufactured in virtually every industrially developed country. Yet the price of these devices is very high. The high cost can be explained by the use of special materials and by the indispensable precision work required. Further, it is a drawback of these devices that they can easily be damaged. A low natural frequency can only be achieved by means of a relatively large weight or mass and a small spring constant.

Geophones or seismophones of special construction have a natural frequency of 2 to 3 Hz. A predetermined natural frequency and a given spring constant are associated with a definite mass. In order to enable the vibrating mass to be held to a low frequency, the known devices are designed with a large spring diameter (up to 12 cm) whereby, however, the dimensions of the apparatus are unfavourably influenced.

SUMMARY OF THE INVENTION

It is an aim of the invention to eliminate, or at least to reduce, the above-mentioned disadvantages.

The underlying task of the invention is to provide apparatus for measuring the velocity of low frequency mechanical vibrations which have generally the same natural frequency as, but smaller weight and dimensions than, the known devices, whereby to reduce their proneness to fault and damage as well as the cost of manufacturing them.

According therefore to the present invention, there is provided apparatus for measuring the velocity of low frequency mechanical vibrations, comprising at least one spring means, a vibratable mass secured to said at least one spring means, at least one coil mechanically coupled to the said mass, a core for said at least one coil which core is made of permanent-magnetic material and which is stationary relative to said coil, wherein the improvement consists in that at least two of said coils are provided one of which is arranged to serve as the measuring coil while at least one other is a feedback coil, there being a controllable current generator having a control input and an output, the said measuring coil being connected to said control input, and the said at least one feedback coil being connected to said output, the connection polarities being so selected as to produce negative feedback.

In an advantageous preferred embodiment of the apparatus according to the invention an integrator is connected between the measuring coil and the control input of the controllable current generator.

In a further advantageous preferred embodiment a summing device is connected between the integrator and the controllable current generator, the summing device having two inputs, one of said inputs being connected with the output of the integrator and the other input being directly connected to the measuring coil.

Expediently, the controllable current generator and the summing device are built together as a common unit, wherein the controllable current generator is or includes an operational amplifier having two inputs; two resistors; one of said inputs being connected to the measuring coil and to the output of the integrator via a respective one of said resistors.

The apparatus according to the invention permits a considerable reduction in the dimensions and weight of the low frequency geophone, whereby it is rendered less prone to faults and less costly. It also enables a significant decrease in the natural frequency of a given geophone — determined by its mechanical construction — by adding the electronic circuitry embodied in this invention.

BRIEF DESCRIPTION OF THE DRAWINGS

A preferred embodiment of the invention is described in detail with the aid of the accompanying schematic drawings, wherein.

DESCRIPTION OF THE PREFERRED EMBODIMENT

Figure 1:
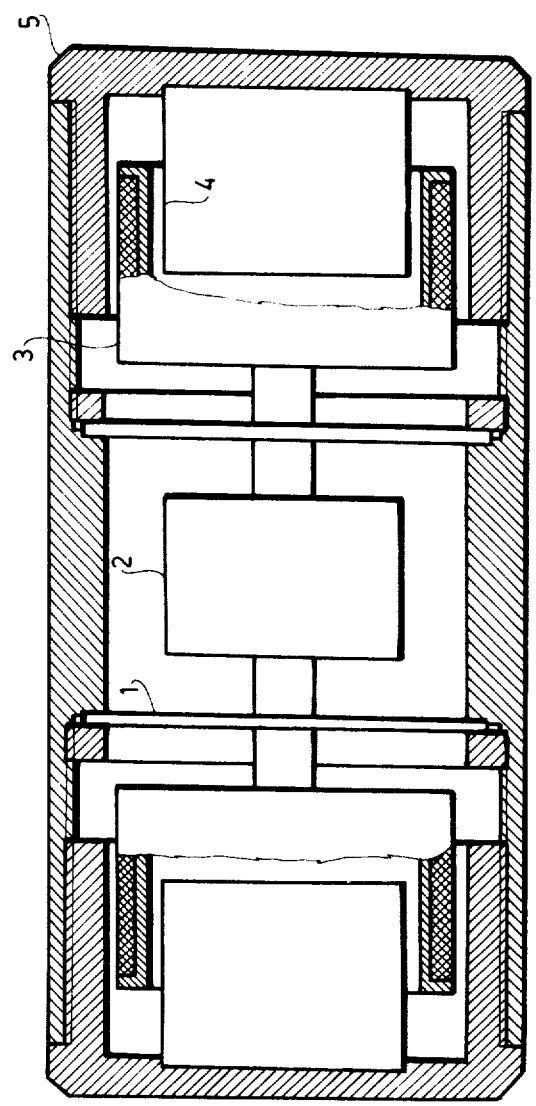
FIG. 1 is a longitudinal section through the usual components or parts of a geophone or seismophone shown by way of example.

Referring to the drawings, the system shown by way of example consists of two principal parts. The first principal part is a per se known geophone or seismophone shown in FIG. 1.

The vibration system of the geophone consists of two plate or disc springs 1 which may be characterised by a spring constant $C_r$, as well as of a mass 2 arranged on the longitudinal axis of the housing and secured to both springs 1. On the outer side of each spring 1 a respective displaceable cylindrical coil 3 is arranged, coaxially with the mass 2. The left-hand (as viewed) coil 3 is arranged to operate as a measuring coil $N_1$ while the right-hand coil is arranged to operate as a feedback coil $N_2$. Within each coil 3 there is a respective core 4 made of permanently magnetic material. The cores 4 are each secured to the respectively adjacent threaded end of the housing by a respective threaded adaptor 5. Expediently the feedback coil $N_2$ is so formed that, even in the event of the greatest displacement that could occur in practice, its windings do not altogether leave (i.e. move past) the core 4.

The adaptors 5 form part of the magnetic circuit, may be unscrewed from the housing ends and when screwed in, constitute the covers of the housing. The system is thus readily assembled together. The pot or cup-shaped coils 3 move in the gap between the inner walls of the adaptors 5 and the cylindrical cores 4.

Figure 2:
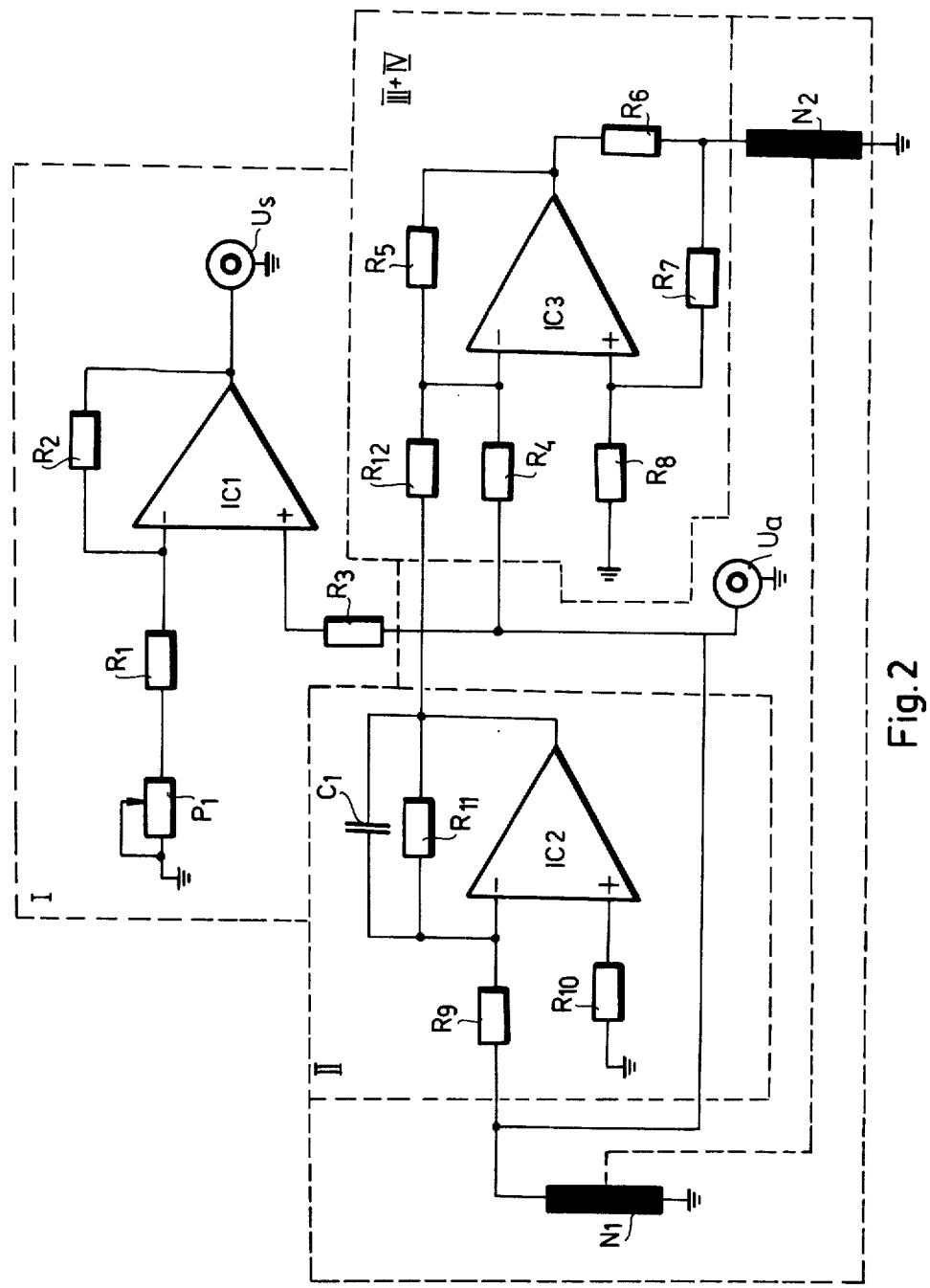
FIG. 2 is a circuit diagram of the electronic circuitry associated with the apparatus of FIG. 1.

FIG. 2 illustrates the electronic circuitry connected to the two coils. In this circuit the positive input of a first (integrated circuit) operational amplifier IC1 is connected via a resistor $R_3$, on the one hand, with the non-grounded end of the measuring coil $N_1$ and, on the other hand, via a further resistor $R_4$, with a negative, phase-shifting input of a third (integrated circuit) operational amplifier to IC3. A second operational amplifier IC2 will be referred to below. The output of operational amplifier IC3 is connected via a resistor $R_6$ to the non-grounded (non-earthed) end of the feedback coil $N_2$. The common point of the latter, and of the resistor $R_6$ is connected via a resistor $R_7$ to the positive input of the third (integrated circuit) operational amplifier IC3. This positive input is also connected to ground via a resistor $R_8$.

The negative input of the third operational amplifier IC3 is coupled, on the one hand, with its own output via a resistor $R_5$, and on the other hand, via a further resistor $R_{12}$ with the output of the second (integrated circuit) operational amplifier IC2. This output is connected by way of a further resistor $R_{11}$ with the negative input of this same operational amplifier. The resistor $R_{11}$ is connected in parallel with a capacitor $C_1$. The positive input of the operational amplifier IC2 is grounded via a resistor $R_{10}$, while its negative input is connected to the non-grounded end of the measuring coil $N_1$ via a resistor $R_9$.

The output of the first operational amplifier IC1 is connected via a resistor $R_2$ with its own negative input which is grounded via a resistor $R_1$ and potentiometer $P_1$ connected in series.

Figure 3:
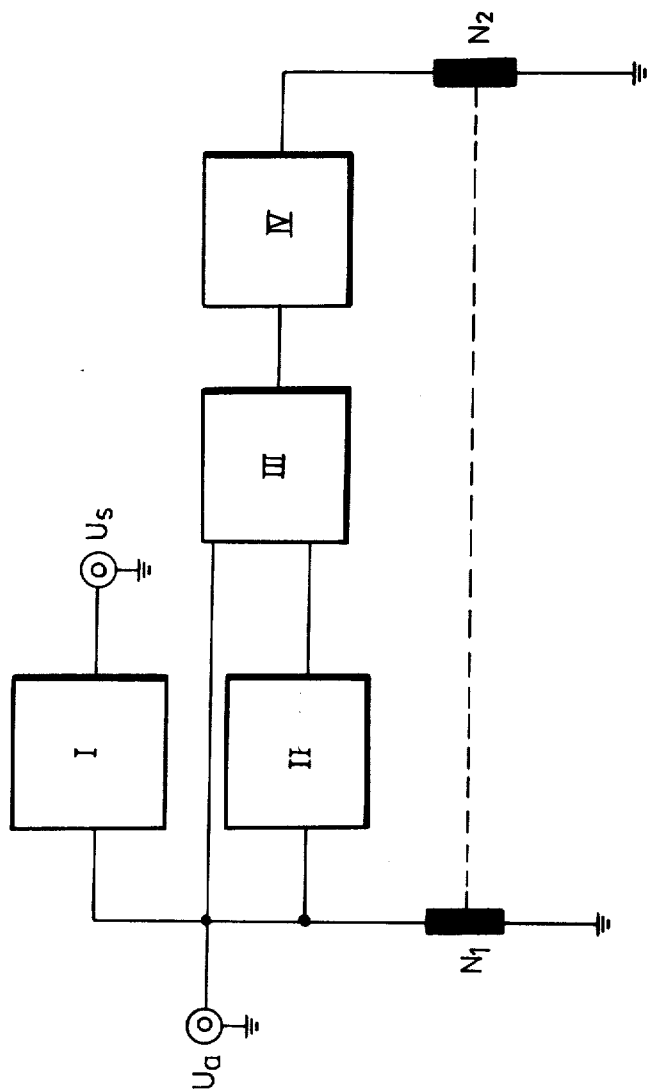
FIG. 3 is a block diagram of the circuitry.

The electronic circuitry shown in FIG. 2 consists essentially of four units I to IV. FIG. 3 shows the circuit in block diagram form. The measuring coil $N_1$ and the feedback coil $N_2$ are mechanically connected together — this is symbolized in FIGS. 2 and 3 by dotted lines.

The non-grounded end of the measuring coil $N_1$ is connected with the input of a pre-amplifier I, with the input of an integrator II and with one input of a summing device III. The output of the integrator II is connected to another input of a summing device III. The output of the summing device III is connected with the control input of a controllable current generator IV the output of which is connected to the non-grounded end of the feedback coil $N_2$.

The geophone according to FIGS. 2 and 3 may have two outputs. One output terminal $U_a$ is the non-grounded end of the measuring coil $N_1$ and the other $U_s$ is the output of the pre-amplifier I. Naturally the pre-amplifier I is not absolutely essential for the geophone.

In this arrangement a current flows through the feedback coil $N_2$ which is the sum of two current components. One current component is proportional to the velocity-proportional signal from the measuring coil $N_1$ and the other is proportional to the displacement-proportional output signal of the integrator II. These two current components produce a damping force component $F_d$ proportional to the velocity of vibration in the homogeneous magnetic field of the core 4, as well as a force component $F_w$ proportional to the coil displacement.

With the appropriate choice of current flow directions the force component $F_d$ constitutes a negative feedback, while the force component $F_w$ constitutes a positive feedback relative to the direction of movement of the vibrating mass. By a suitable change in the circuit gain the amount of damping may easily be adjusted to an optimal value. The direction of the force component $F_w$ is such as to reduce the spring force $F_r$ — which is proportional to the displacement — and thus also the spring constant $C_r$ and the undamped natural frequency of the mechanical system.

In the illustrated system a natural frequency of 2.5 Hz may readily be achieved by using a controllable current generator of small output. In comparison measurements with a precision geophone it was found that the time functions of the signals excited by both systems coincided in the low frequency range also and no phase difference could be detected.

The undamped natural frequency modified by electric feedback and the damping may be calculated from the following formulae:

$$f_o = \frac{1}{2\pi} \cdot \sqrt{\frac{C_r}{m}} \cdot \sqrt{K}$$

$$\xi = \frac{1}{2} \cdot \frac{K + \alpha \cdot S_E \cdot E_o^2}{m(C_r - C_w)}$$

where
$f_o$ is the undamped natural frequency
$\xi$ the damping
$C_r$ the spring constant
$k$ the damping coefficient
$m$ the vibrating mass
$K$ a factor characterising the reduction in natural frequency
$\alpha$ the transfer factor (gain constant) of the negative feedback
$C_w$ a constant characterising the positive feedback
$S_A$ the transfer gradient of the current generator
$E_o$ " the basic sensitivity of the geophone An already produced geophone according to the invention and including the electronic circuitry was found to require only about 1/10th of the spatial requirements of a corresponding conventional geophone. Further reduction in dimensions is however possible. Such a geophone may be built into a combined apparatus without difficulty. Due to the reduced weight it is less sensitive to large mechanical influences and its stability is also better.

The manufacturing costs, including the electronics, amount also to about 1/10th of the manufacturing costs of conventional precision geophones.

We claim as our invention:

1. Apparatus for measuring the velocity of low frequency mechanical vibrations, comprising at least one spring means, a vibratable mass secured to said spring means, at least two coils mechanically coupled to said mass, a core for each coil of a permanent magnetic material, said cores being stationary relative to said coils, at least one of said coils serving as a measuring coil, while at least one other coil is a feedback coil, a controllable current generator having a control input and an output, said measuring coil being connected to said control input and said feedback coil being connected to said output, the current fed through said feedback coil by said current generator being of the same direction as the current generated in said feedback coil by the vibration of said mass.

2. Apparatus according to claim 1 wherein an integrator is connected between the measuring coil and the control input of the controllable current generator.

3. Apparatus according to claim 2 wherein a summing device is connected between the integrator and the controllable current generator, there being two inputs for the summing device, one of said inputs being connected with the output of the integrator and the other input being directly connected to the measuring coil.

4. Apparatus according to claim 3 wherein the controllable current generator and the summing device are built together as a common unit, and wherein the controllable current generator includes an operational amplifier having two inputs; two resistors; one of said inputs being connected to the measuring coil and to the output of the integrator via a respective one of said resistors.

* * * * *